J. Curtis,

Wind Wheel,

Nº 10,959.  Patented May 23, 1854.

UNITED STATES PATENT OFFICE.

JAMES CURTIS, OF CHICAGO, ILLINOIS.

IMPROVED WINDMILL.

Specification forming part of Letters Patent No. 10,959, dated May 23, 1854.

*To all whom it may concern:*

Be it known that I, JAMES CURTIS, of Chicago, in the county of Cook and State of Illinois, have invented certain new and useful Improvements in Wind-Wheels; and I do hereby declare the following to be a full, clear, and exact description of the same, reference being had to the accompanying drawings, making a part of the same, in which—

Figure 1:
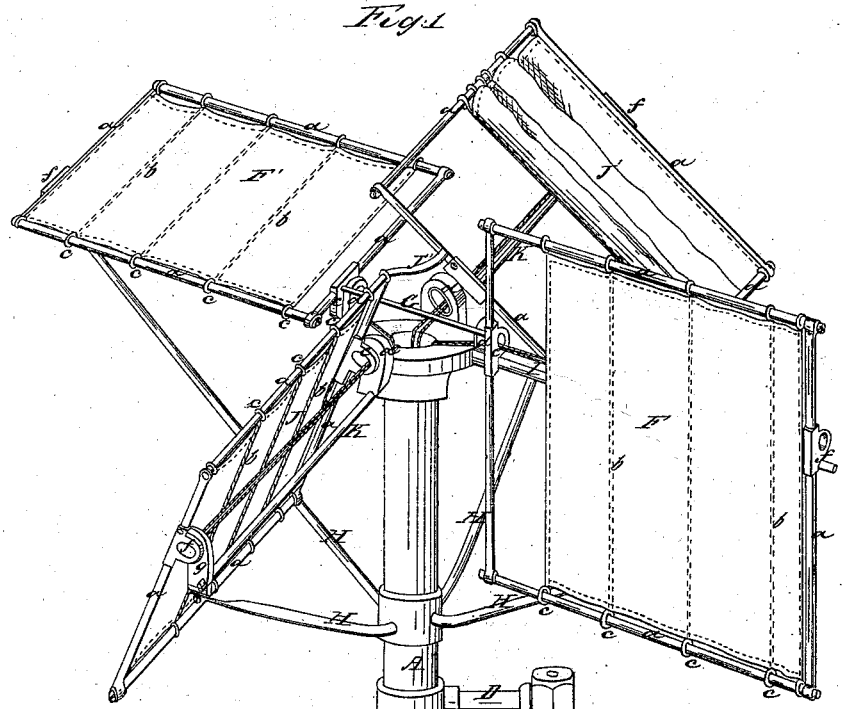
Figure 2:
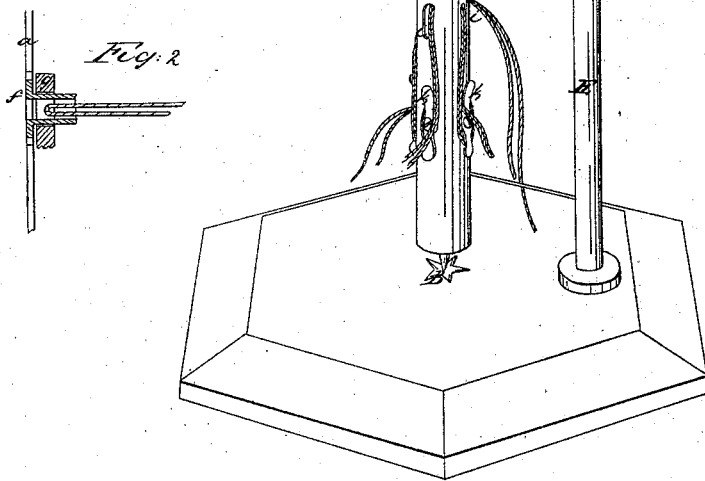

Figure 1 represents a perspective view, and Fig. 2 a section through one of the hollow bearings.

Similar letters in both the figures denote like parts.

The nature of my invention consists in the so hanging of the pairs or sets of sails upon one shaft extending both ways from the center shaft as that when one sail of the pair turns to the wind its fellow shall by the partial turning of their common shaft turn edgewise to prevent resistance to the wind and aid its fellow in so doing; also, in the hollow bearings, upon which the sails pivot or turn, so that the lines by which the sails are reefed may pass through them.

To enable others skilled in the art to make and use my invention, I will proceed to describe the same with reference to the drawings.

A represents a hollow shaft supported in a step B at its base and a sleeve or boss B', attached to an arm D of the fixed upright E above the step to give the shaft support.

F F' are one of the sets or pairs of sails attached to the extreme ends of a common shaft G, so that said shaft shall turn with the sails. The frames of the sails are oblong or square, and composed of the metallic pieces $a\ a\ a\ a$, and the sails have rods or stays $b\ b$ (in dotted lines) passing through with eyes $c\ c$ turned on them to keep them and allow them to move or slide on two of the opposite pieces $a\ a$ of the frame. These sails are set at such angle or inclination to each other that when one is fair to the wind, as F, the other F' shall be nearly horizontal, and one aids the other in making the changes. The sails are caught when fair up to the wind by the braces H H H H, which extend from the shaft to the extreme ends of the sail-frames, serving the double service of braces and guides to the turning of the sail-frames.

$d\ d\ d\ d$ are hollow bearings to which the sail-frames are pivoted, so as to turn thereon, and $e\ e\ e\ e$ are similar hollow bearings on the sail-frames.

I is a shaft extending from the inside to the outside pieces of the sail-frames, and which might be considered as a part of the shaft G, for said shaft G, instead of terminating at the frame, as represented, may extend to the outer extremity of said frame; but one shaft I is shown to the sail F, a precisely similar one being connected to the other sail F' of the pair. $f\ f$ are the outer bearings on the sail-frames, and $g\ g$ the outer corresponding bearings on the extremes of the sail-shafts, both being hollow, as in the case of the inner bearings.

J J' are the other set or pairs of sails similarly rigged in all respects with the pairs F F', except that their common shaft J'' is bent upward, so as not to interfere with the shaft G of the other set. In these sets or pairs K corresponds to the shaft I of the other set.

The red and blue lines represent the cords for reefing or furling the sails and holding them at a full or a fractional reef, according to the force of the wind. These reefing-lines pass through the hollow bearings, thence down through the hollow shaft and out at the openings $i\ i$ in said shaft, and are secured to the blocks $k\ k$ on said shaft. At or below this point on the shaft may be arranged a platform for the attendant to stand on, so that he may stand thereon and reef the sails while the wind-wheel is in motion. In the outer bearings are arranged a small friction-roller, as seen in Fig. 2, around which one of the reefing-lines (in red) passes, so as to draw the sails out to their extreme distance, the blue line being for taking them in.

The sail-frames are hung to their shafts with the greater portion below said shaft to aid in turning them and cause the turning of one to aid the other.

I am aware that means have been essayed to cause one sail to turn the other, in which a system of lines and levers were combined for the purpose; but in that method one sail must of necessity use or exert all the force required to turn the other one, while in my arrangement each one of the pairs aids the other in coming to its place, whether fair up to or horizontal to the wind. Besides the levers and lines were complicated and uncertain.

Having thus fully described the nature of my invention, what I claim therein as new, and desire to secure by Letters Patent, is—

1. The so hanging of the pair or sets of sails upon one shaft extending both ways from the center as that when one sail of the pair turns to the wind its fellow shall by the partial turning of the shaft turn edgewise to prevent resistance, substantially as described.

2. The hanging of the sail-frames on hollow bearings, in combination with the sails and lines for the purpose of reefing and furling the sails at pleasure while the wind-wheel is in motion, substantially as described.

JAMES CURTIS.

Witnesses:
A. B. STOUGHTON,
SAML. GRUBB.